United States Patent
Eichstaedt et al.

(10) Patent No.: US 6,169,989 B1
(45) Date of Patent: Jan. 2, 2001

(54) METHOD AND APPARATUS FOR PARALLEL PROFILE MATCHING IN A LARGE SCALE WEBCASTING SYSTEM

(75) Inventors: Matthias Eichstaedt; Qi Lu, both of San Jose, CA (US); Shang-Hua Teng, Champaign, IL (US)

(73) Assignee: International Business Machines Corporation, Armonk, NY (US)

(*) Notice: Under 35 U.S.C. 154(b), the term of this patent shall be extended for 0 days.

(21) Appl. No.: 09/082,747

(22) Filed: May 21, 1998

(51) Int. Cl.⁷ .................................................. G06F 17/00
(52) U.S. Cl. ........................ 707/100; 707/2; 707/10; 707/104; 705/1; 705/400; 709/201
(58) Field of Search ................ 707/103, 4, 100, 707/2, 10, 104; 705/1, 400; 709/201

(56) References Cited

U.S. PATENT DOCUMENTS

| | | | | |
|---|---|---|---|---|
| 5,724,521 | * | 3/1998 | Dedrick ............................ | 395/348.7 |
| 5,754,939 | * | 5/1998 | Herz et al. ......................... | 455/4.2 |
| 5,974,396 | * | 10/1999 | Anderson et al. ................ | 705/10 |
| 5,987,454 | * | 11/1999 | Hobbs ................................ | 707/4 |

OTHER PUBLICATIONS

Ravi Kalakota, "Information Supply–Chains and Webcasting: A Design Framework", IEEE, Community Networking Proceedings, Fourth International Workshop, pp. 103–111, 1997.

K. Skala, Z. Nikolic, B.M. Rogina, D. Kolaric, "Pseudo Real–Time Virtual Reality Webcasting of a Sailing Ragatta on Internet", IEEE, New Frontiers of Information Technology, Short Contributions, Proceedings of the 23rd Euromicro Conference, pp. 138–143, 1997.

Arash Aminian, "Webcasting Presentations", IEEE Multimedia, vol. 4 4, pp. 83–84, Oct.–Dec. 1997.

S. Kinoshita, T. Shiroshita, T. Nagata, "The RealPush Network: A New Push–Type Content Delivery System Using Reliable Multicasting", Consumer Electronics, IEEE Transactions on Volume: 44 4, pp. 1216–1224, Nov. 1998.

Michael Franklin and Stan Zdonik, "Data In Your Face: Push Technology in Perspective", ACM SIGMOD international conference on Management of data, pp. 516–519, 1998.

C. Leangsuksun, J. Potter, S. Scott, "A Task Graph Centroid", IEEE, pp. 219–225, 1997.

* cited by examiner

Primary Examiner—John Breene
Assistant Examiner—Cheryl Lewis
(74) Attorney, Agent, or Firm—Gray Carey Ware & Freidenrich; Khanh Q. Tran, Esq

(57) ABSTRACT

A method and apparatus for efficiently matching a large collection of user profiles against a large volume of data in a webcasting system. The invention generally includes in one embodiment four steps to parallelize the profiles. First, an initial profile set is partitioned into several subsets also referred to as sub-partitions using various heuristic methods. Second, each sub-partition is mapped onto one or more independent processing units. Each processing unit is not required to have equal processing performance. However, for best performance results, subset data should be mapped in one embodiment where the subset with a highest cost is mapped to a fastest processor, and the next highest cost subset mapped to the next fastest processor. Where appropriate, the invention evaluates the relative subset processing speed of each processor and adjusts future subset mapping based upon these evaluations. For each information item I that needs to be matched with a profile predicate, a third and a fourth step are executed. The third step broadcasts I to all processing units, and a fourth step performs a sequential profile match on I.

32 Claims, 9 Drawing Sheets

METHOD AND APPARATUS FOR PARALLEL PROFILE MATCHING IN A LARGE SCALE WEBCASTING SYSTEM

BACKGROUND OF THE INVENTION

1. Field of the Invention

The present invention relates to the efficient management of a large collection of user profiles and matching the profiles against a large volume of data. More particularly, the invention concerns a parallel profile matching method that efficiently manages the profiles, matches them to desired data using existing profile matching methods, and efficiently pushes the data to a user.

2. Description of the Related Art

Within the last twelve months, a new breed of Internet information system called webcasting or "push" systems has attracted enormous attention in the Internet industry. Instead of using a browser to pull information from the Internet, a push system automatically delivers information contents such as news and weather forecasts to a user based on a user's interest profile. The user's profile is a collection of predicates that identify the type, quantity or quality of information that should be pushed to the user. Because of its tremendous potential for completely changing the shape of the Internet, the battle for leadership has increasingly intensified.

Webcasting technology not only thrives on the Internet, but it can also be effectively applied in corporate intranets to vastly improve business operations and productivity. For example, a sales representative can be constantly alerted with new product information and price updates to better serve his or her customers, or on-line classified advertisements on apartments for rent can be automatically pushed to corporate employees who are looking for a place to live. Another application of webcasting is that newly issued U.S. patents within designated technology fields can be pushed to the users who have interests in them.

Currently, information delivered by a webcasting system is typically organized into a hierarchy of content channels. Because of the sheer volume of information in cyberspace, the key to allowing the webcasting technology to realize its full potential is giving users the ability to personalize their information selection and filter out "noise." For example, a user subscribing to the IBM-Almaden-Seminar channel may use a filter to select only those seminars related to database technology. Non-related seminars or "noise" are thereby filtered out. This kind of personalized information content selection is recorded in user profiles and matched against all the information delivered by webcasting. The common practice in Internet information systems is to use traditional database indexing schemes on information contents, where user profiles are applied to an information index one at a time.

A main drawback in webcasting today is the lack of personalization. For example, users cannot customize their profile to only receive information about their favorite team when subscribing to a sports channel. Information covering all teams is usually pushed to the user because it is not possible to personalize the information.

At the heart of content personalization is the profile matching problem. Each user has a "personal" profile that specifies his or her interests and is usually represented as a Boolean expression over a basic predicate. A profile matching method will match a document with all profiles in a profile-database and return only those profiles whose Boolean expression is satisfied by the content of the document. This is a computationally expensive problem because of the large subscription volume and the diversity of information content. Regardless, webcasting systems must quickly perform profile matching "on-line" because they must deliver information in a timely fashion. Further, they have to maintain a dynamically changing profile database.

Cyberspace continues to expand as more and more people gain access to the Internet, resulting in an exponential increase in user profiles. What is needed is an invention that can perform large scale and high performance profile matching with a parallel profile matching method that can be applied to any Boolean based query language. Preferably, the method would utilize existing sequential profile matching methods currently used in webcasting systems.

DEFINITIONS AND NOTATIONS

Throughout the following discussion, the following definitions and notations apply:

$A=\{A_1, \ldots, A_n\}$ is a set of Boolean profile expressions, $BP=\{p_1, \ldots, p_m\}$ is a set of basic predicates, $W=\{w_1, \ldots, w_m\}$ is a set of weights, that are associated with each basic predicate, and $G_1, \ldots, G_k$ is a set of directed acyclic graphs (DAGs).

Each profile expression $A_i$ contains a set of basic predicates, which are connected by the Boolean operators AND, OR and NOT (see FIG. 6). A profile expression $A_i$ can be represented by a DAG where the basic predicates are mapped to leaf nodes and the Boolean operators are mapped to inner nodes of the DAG. Using this representation for a set of profile expressions A yields a set of DAGs. All DAGs' root nodes are connected by a single root node to form a single DAG.

SUMMARY OF THE INVENTION

Broadly, the present invention solves a new technical challenge posed by the rapid growth of webcasting systems: how to efficiently match a large collection of user profiles against a large volume of data using parallel profile matching.

The invention may be implemented on a webcasting system that maintains a large collection of user profiles. The user profiles express each users interest and are based on any Boolean query language using basic predicates. These predicates are used to assert certain properties to information items. Basic predicates can be connected together with Boolean operators AND, OR and NOT to form more complex queries. As an example, the profile "Channel(Almaden-Calendar) AND Keyword(database)" expresses that the user is only interested in events at a location Almaden related to database topics. Channel(Almaden-Calendar) and Keyword (database) are examples for basic predicates connected by the AND operator. An example of one such webcasting system may be found in U.S. patent application Ser. No. 08/978,737, by M. Eichstaedt et al, entitled "METHOD AND APPARATUS FOR EFFICIENT PROFILE MATCHING IN A LARGE SCALE WEBCASTING SYSTEM," filed Nov. 26, 1997, assigned to the assignee of the present invention and incorporated herein by reference. This information delivery system matches information items from a stream of documents against a profile collection and sends a personalized stream of information to each user based upon the user's profile.

In one embodiment, the invention may be implemented to provide a method to partition a profile database and distribute each partition to a separate processor. The invention partitions a large collection of user profiles into smaller profile subsets and assigns those subsets to separate processing units based upon a subset's cost. A subset's cost is substantially the cumulative total of the individual costs for profile data contained in the subset. Profiles are partitioned in such a way that each subset can be processed individually without extensive communication with other subsets being processed.

The invention includes in one embodiment four steps to parallelize the profiles. First, an initial profile set is partitioned into several subsets (also referred to as sub-partitions) using various heuristic methods. Second, each sub-partition is mapped onto one or more independent processing units. Each processing unit is not required to have equal processing performance. However, for best performance results, subset data should be mapped in one embodiment where the subset with a highest cost is mapped to a fastest processor, and the next highest cost subset mapped to the next fastest processor. Where appropriate, the invention evaluates the relative subset processing speed of each processor and adjusts future subset mapping based upon these evaluations. For each information item I that needs to be matched with a profile predicate, a third and a fourth step are executed. The third step broadcasts I to all processing units, and a fourth step performs a sequential profile match on I.

Given a positive integer k, the profile matching problem is to minimize the maximum total weight of the basic predicates in each subset. One method for partitioning and mapping the subsets, called Greedy-Mapping (GM), generates subsets that have a small overlap with each other. Let $S_1$ and $S_2$ be two subsets of profiles and let $D_1$ and $D_2$ be their DAGs respectively. Let B be the set of basic predicates shared by both $D_1$ and $D_2$, then the overlap between $S_1$ and $S_2$ is equal to the total weight of the basic predicates in B. The Greedy-Mapping processes profiles in the profile database one after another. Initially we have k empty subsets (a placeholder for the final partition of the profiles). Based on the notion of overlap, the "fitness" is determined for each profile and the profile is assigned to a subset with the best fitness.

In an alternative embodiment, an incremental clustering (IC) method builds the subsets of profiles one after another. The basic idea is to properly choose a profile that can be mapped to the current subset until a certain threshold of the total weight of the basic predicates is reached. Generally, the threshold is determined by the expected total weight of each subset.

In another embodiment, the invention may be implemented to provide an apparatus capable of efficiently matching a large collection of user profiles against a large volume of data using parallel profile matching and delivering the data to a user.

In still another embodiment, the invention may be implemented to provide a signal-bearing medium tangibly embodying a program of machine-readable instructions executable by a digital data processing apparatus to perform method steps for efficiently matching a large collection of user profiles against a large volume of data using parallel profile matching.

The invention affords its users with a number of distinct advantages. One advantage is that the parallel profile matching method automatically partitions a profile database. This provides a scalable method to match a large collection of user profiles against a large volume of data.

Another advantage is adaptability. The methods of this invention can adapt to changes in user profiles and information feeds to maintain efficient performance by adjusting the processing load balance of the profiles. As mentioned above, the invention is directed towards information push systems, but can also be applied in notification, alert, or other kinds of information push systems that use a Boolean-based profile language.

Yet another advantage is performance. The techniques employed by the invention efficiently utilize dynamic cost/credit information and a logical structure among predicates to achieve high performance over time. In essence, the invention learns as it goes along. One more advantage is that the invention employs a plurality of processors to perform the parallel profile matching. However, the invention intentionally minimizes interaction among the processors to further expedite profile processing.

One additional advantage is that the invention utilizes existing sequential matching methods and can be applied to any Boolean based query language. As readily recognizable to one schooled in the art, the invention also provides a number of other advantages and benefits, that will become apparent after reviewing the following description of the invention.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, and wherein.

DETAILED DESCRIPTION OF THE PREFERRED EMBODIMENTS

The nature, objects, and advantages of the invention will become more apparent to those skilled in the art after considering the following detailed description in connection with the accompanying drawings. As mentioned above, the invention concerns a method and system for efficiently matching user profiles with desired information.

HARDWARE COMPONENTS & INTERCONNECTIONS

Figure 1:
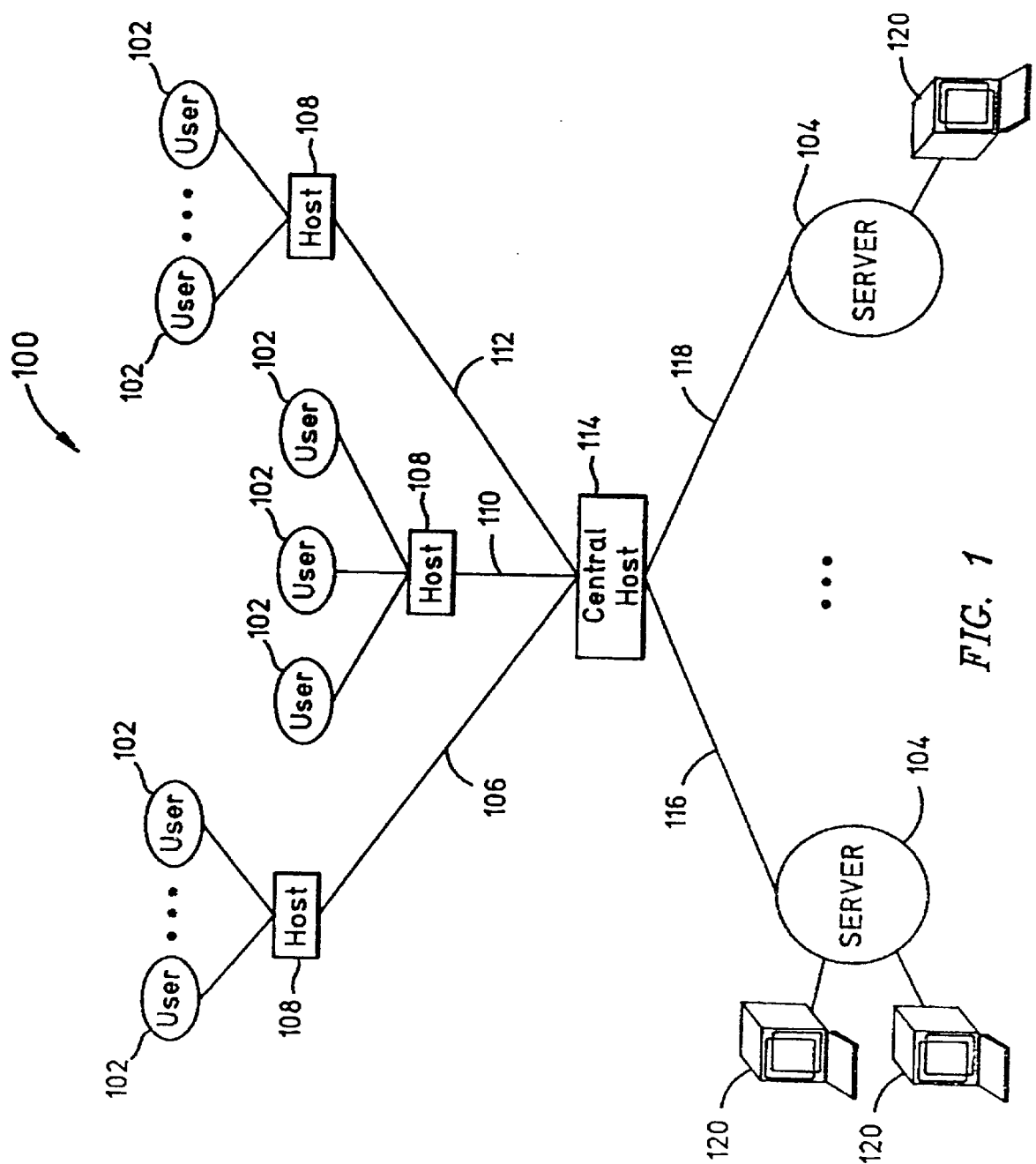
FIG. 1 is a block diagram of the hardware components and interconnections of a network used to transfer information in accordance with one embodiment of the invention.

One aspect of the invention concerns a webcasting system 100, which may be embodied by various hardware components and interconnections as described in FIG. 1.

The webcasting system may be composed of several independent communicatively-connected functional components. The system 100 may comprise a large number of clients, where each client uses a user interface 102 that is continually updated with information that matches a profile specified by a user. The user interface may be a programming interface or a graphic users interface (GUI), such as those used by push-client vendors. The interface 102 allows a user to specify an address in the webcasting system that may contain information that matches a particular user-specified profile. For instance, a user could define a webcasting location that contains local traffic reports from a public Web server. Any time a traffic report is updated, a copy of the report or a short summary appears on the user interface. In order for the summary to appear, the user interface 102 may be communicatively-connected to a host 108 which is turn may be connected to a central host 114. The hosts communicate with a profile handler 306 and profile matcher 308 embodied in the webcasting system 100, shown in FIG. 3, and discussed below.

Figure 2:
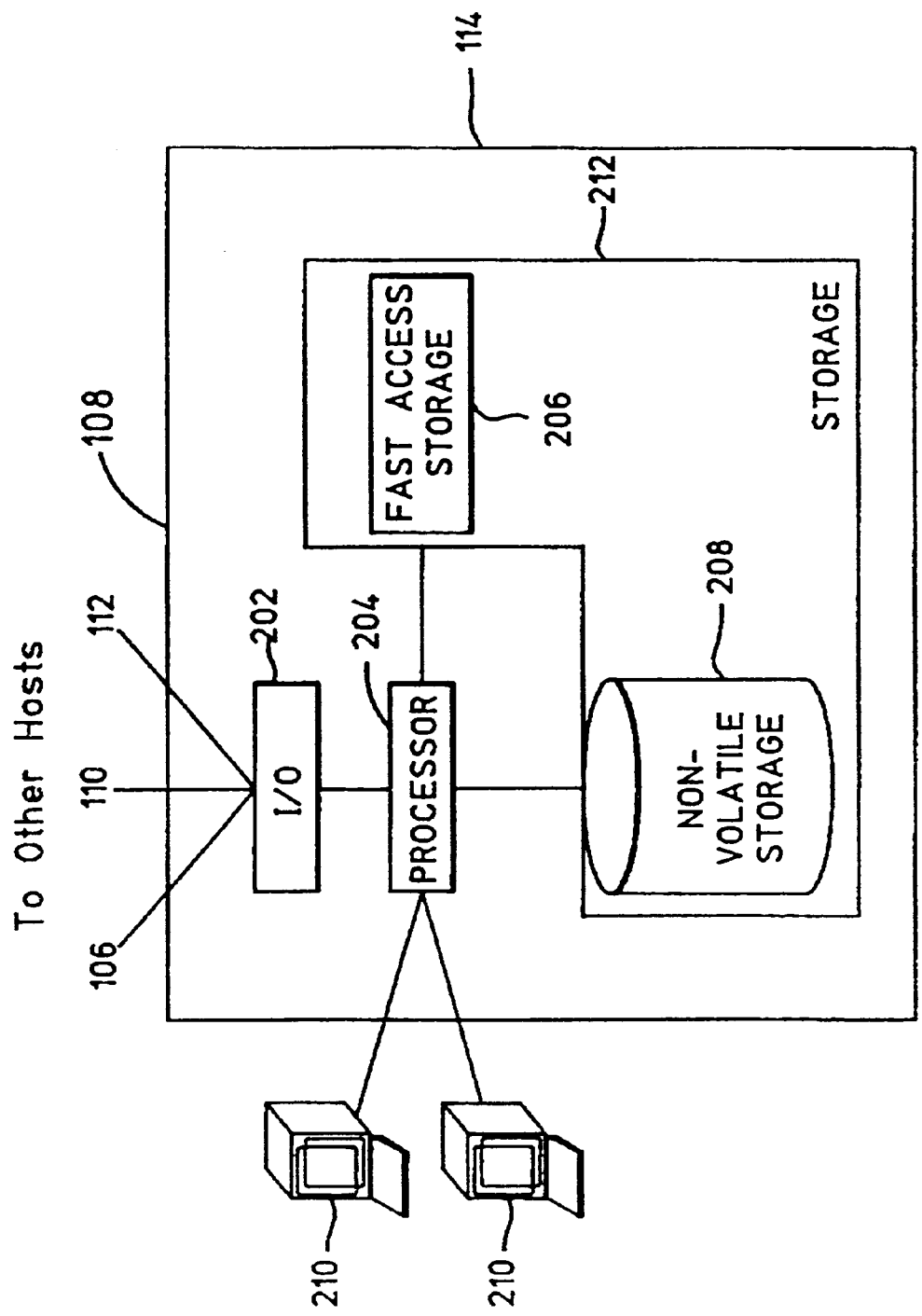
FIG. 2 is a block diagram of a digital data processing machine shown in FIG. 1 in accordance with the invention.

As shown in FIG. 2, any host, such as exemplified by central host 114, may include a processor 204, such as a microprocessor, application specific hardware, or other processing machine, coupled to a storage 212. In the present example, the storage 212 includes fast-access-storage 206 as well as non-volatile storage 208. The fast-access-storage preferably comprises random access memory, and may be used to store the program instructions executed by the processor 204. The non-volatile storage 208 may comprise, for example, one or more magnetic data storage disks such as a "hard drive", a tape drive, or any other suitable storage device. A host may also include an input/output (I/O) controller 202 to coordinate the flow of data and commands to the processor 204. The I/O controller 202 may be communicatively-linked to lines 106, 110 and 112 such as a line, bus, cable, electromagnetic link, communication channel, interface or other means for exchanging data with the processor 204. A host may include a display 210 comprising a video monitor, printer, memory, or any type of display suitable for displaying the user interface 102.

As shown in FIG. 1, the central host 114 is connected to one or more servers 104 via communication channels 116 and 118. These communication channels may be a line, bus, cable, electromagnetic link, or any other means used for exchanging data between a user 102 and a server 104. The server 104 may contain a digital processing apparatus, storage, a database, or various other apparatuses commonly used in Internet server sites. A server 104 of the webcasting system 100 may include a profile system 300 shown in FIG. 3 and used to match a client-specific profile with information located on the server 104.

Figure 3:
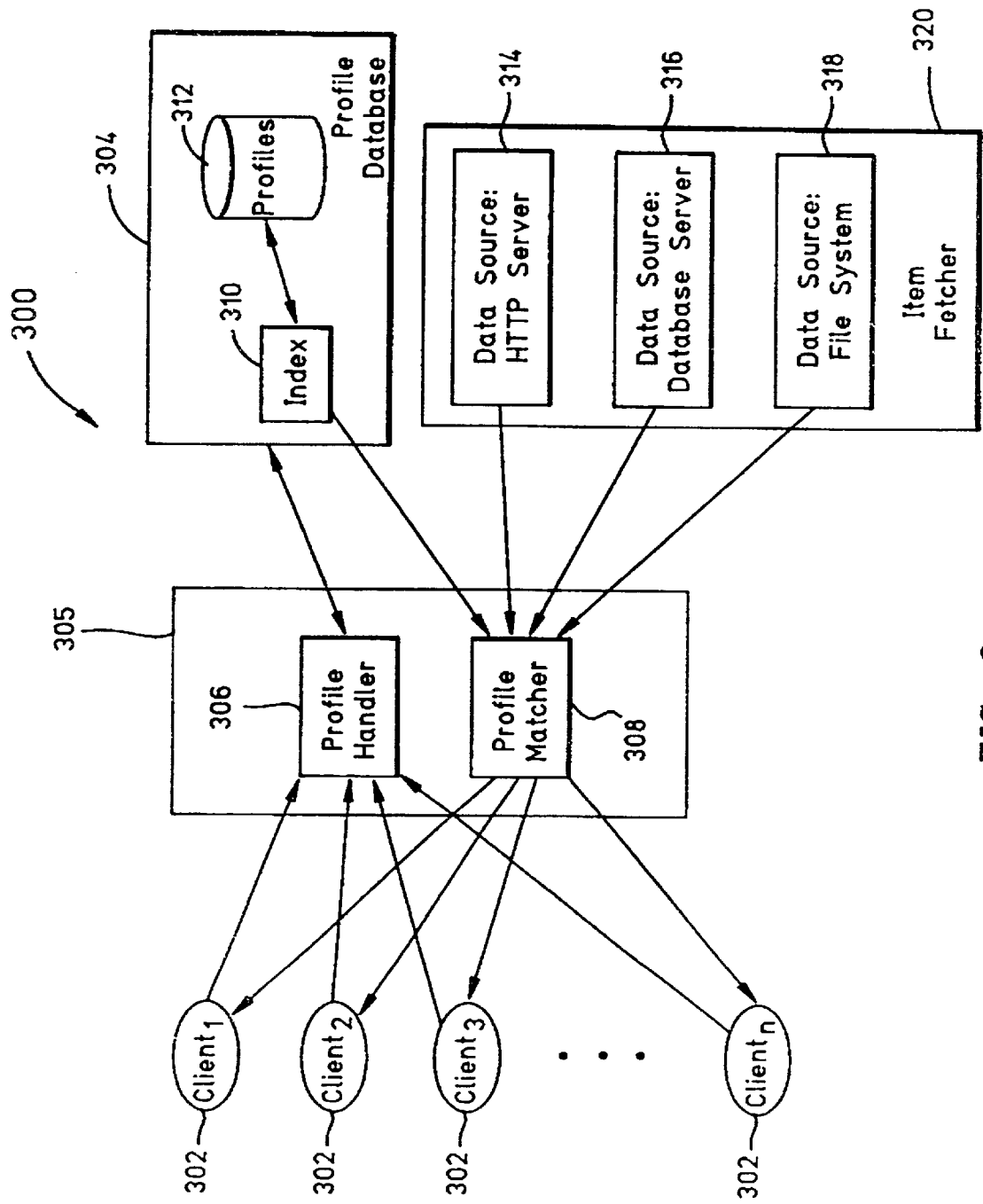
FIG. 3 is a block diagram of a profile matching system for a large-scale webcasting environment in accordance with the invention.

FIG. 3 shows a logical configuration for a profile system 300 used in one embodiment of the present invention. One or multiple clients 302—each which access the profile system 300 through the user interface 102 shown in FIG. 1—communicates with a profile engine 305 comprising a profile handler 306 and a profile matcher 308. The system 300 may include one or more profile engines 305. Each profile handler receives specified profiles from a client. Clients 302 are represented as clients 1 through n, where n equals the total number of clients having access to the system 300. Once a profile is received from a client, the profile is stored in the profile database 304. If a client 302 is a new user to the profile system 300, the new client can be registered with the system, and existing profiles contained within the profile database 304 are updated.

Registration may be by both open and closed registration. Open registration allows a new user to connect to the profile handler 306 at any time to create a new account on his or her behalf. The new account is then stored in the profile database 304. Because the overhead to the database 304 for open registration is minimal, any user can create an unlimited number of accounts within a profile. Closed registration refers to all accounts for regular users which must be created by an administrator of the profile handler 306. The administrator (not shown) initializes new accounts and provides a password for every new user, and may be contained within the profile handler or the server 104. The administrator and the profile handler 306 are communicatively-coupled to the profile database 304 and data sources 314–318.

The profile system 300 may also include one or more profile matchers 308. A profile matcher compares each information item against each user profile. In other words, each item of information relating to the traffic data referred to in the example above would be matched to each user profile requesting such traffic information. The profile matcher 308 output may be a sequence of tuples in the preferred embodiment that consists of a data pair comprising an information item and a profile identification item. These items are sent to the matching client 302 which in turn displays the items to the user interface 102. In the preferred embodiment, the profile matcher 308 updates its internal data structure whenever changes to the profiles are made and recorded in profile database 304.

One or more item fetchers 320 may be included in the profile system. An item fetcher 320 may comprise different forms known to those schooled in the art depending on the type of data that is to be distributed by the profile system 300. For example, FIG. 3 shows an item fetcher 320 for a HTTP server, a DATABASE server and a FILE SYSTEM server. The item fetcher 320 is communicatively-coupled to the profile matcher 308 and each of the components contained therein collect data from a variety of data sources. In the preferred embodiment, the item fetcher 320 periodically delivers a set of information items to the profile matcher 308. In another embodiment the item fetcher 320 delivers information sets only when requested by the profile matcher 308. The item fetcher may comprise an apparatus such as shown in FIG. 2 for a host 114, or may be integral to the structure of a server 104 shown in FIG. 1.

Figure 4:
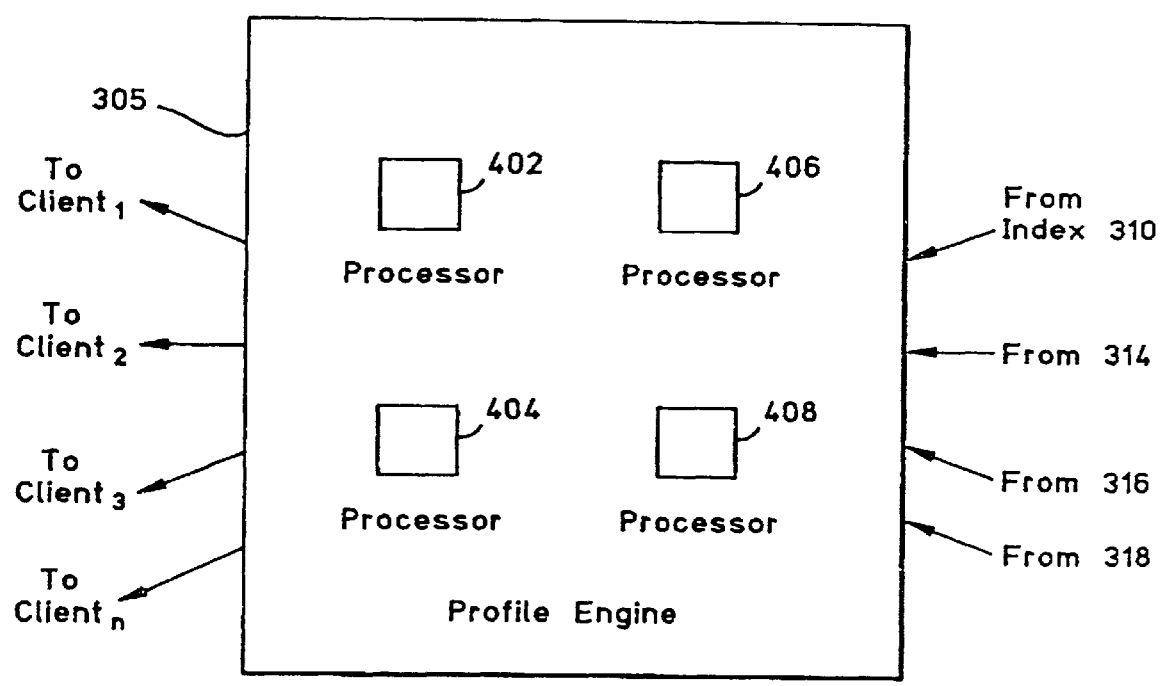
FIG. 4 shows a block diagram of a profile engine of FIG. 3 in accordance with one embodiment of the present invention.

As shown in FIG. 4, the profile engine 305 may include multiple processors 402. Although pictured in the profile matcher 308, the processors can be physically located anywhere in the profile system 300 as long as they remain logically configured to perform the profile matcher 308 processing as described below. The processors may be communicatively coupled by a line, bus, cable, electromagnetic link, communication channel, interface or other means for exchanging information. Mapping of data to and from the processors may occur in one embodiment, at least in part, as described below.

Despite the specific foregoing description, ordinarily skilled artisans having the benefit of this disclosure will recognize that the apparatuses discussed above may be implemented in machines of different construction without departing from the scope of the invention. As a specific example, the non-volatile storage component 208 of FIG. 2 may be eliminated or replaced by tape storage; furthermore, the fast-access-storage 206 may be provided on-board the processor 204, or even provided externally to a host 108. Also, one schooled in the art will readily understand that various processing configurations may be used for the profile handler 306 and the profile matcher 308 to perform their respective processing machinations. For example, the profile handler 306 and profile matcher 308 may be configured similarly to a host apparatus as shown in FIG. 2.

OPERATION

In addition to the various hardware embodiments described above, a different aspect of the invention concerns a method for efficient profile matching in a large scale webcasting system.

Overall Sequence of Operation

Figure 5:
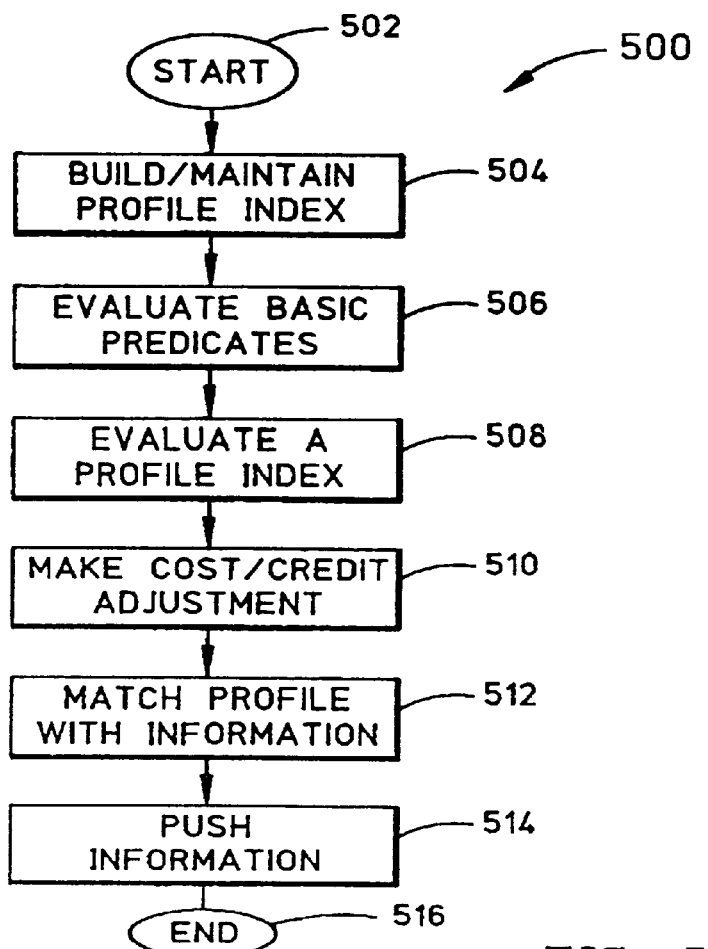
FIG. 5 is a flowchart of a general operational sequence for profile matching for the large-scale webcasting environment in accordance with one embodiment of the invention.

FIG. 5 shows a sequence of method steps 500 to illustrate a general example of a Boolean based query language profile method used in one embodiment of the present invention. For ease of explanation, but without any limitation intended thereby, the example of FIG. 5 is described in the context of the webcasting system 100, and more particularly the profile system 300, described above.

The method of invention allows for scalability and improved performance in large-scale profile matching systems such as found on a server 104 (FIG. 1) commonly used by Internet service providers (Provider). Most subscribers to a Provider share similar interests with other subscribers to the same Provider, and many of the primary predicates specified in a large collection of user profiles are shared by a number of users. In one embodiment, the present invention takes advantage of this relational fact beginning in step 502, when the method of the present invention is employed, for example, in a server 104.

A profile index is built and maintained in step 504 with a complete collection of user profiles for each basic predicate. Adding a new user profile will have negligible negative effect because most of the basic predicates in the new profile are very likely already represented in the profile index.

Figure 6:
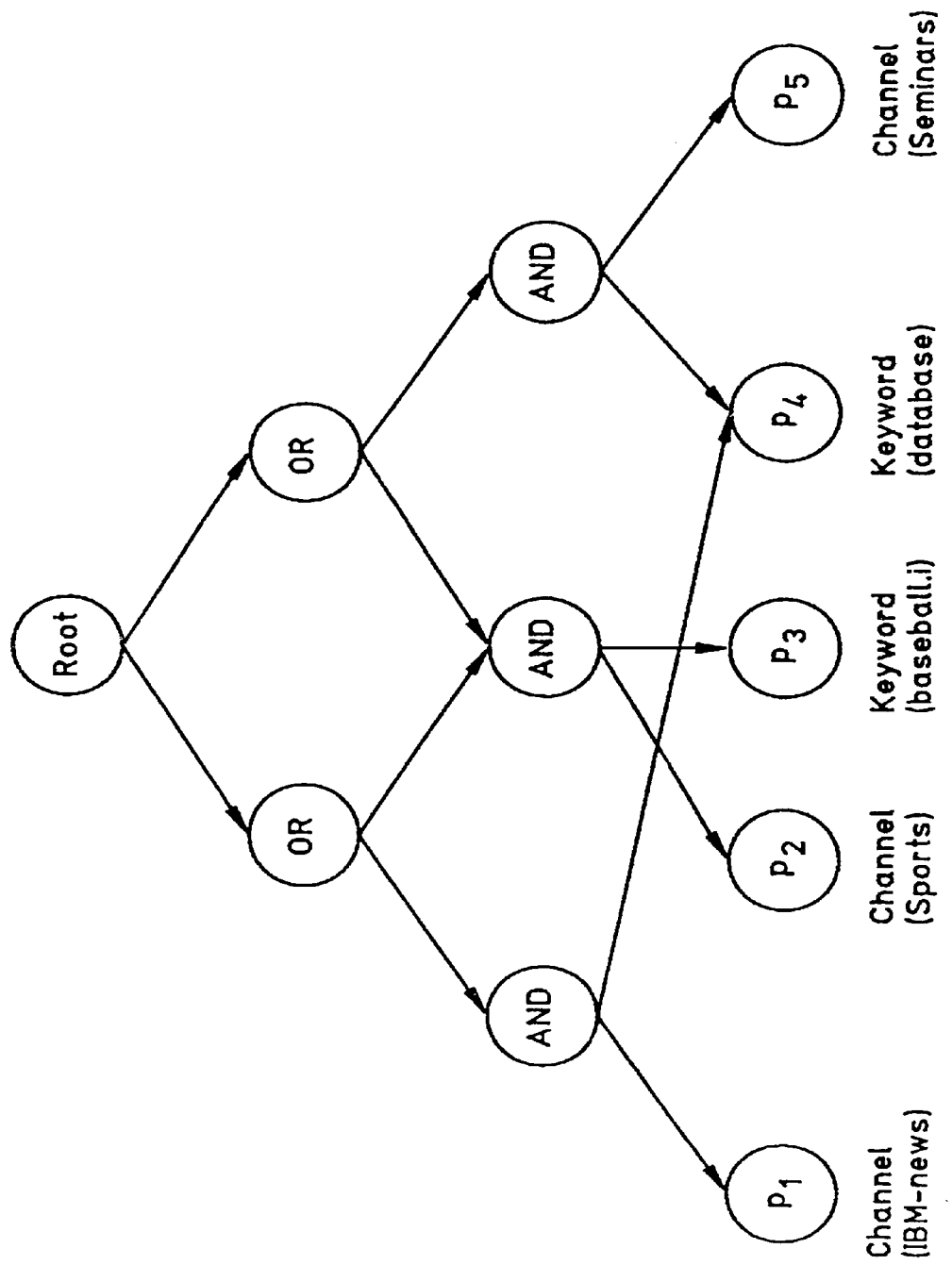
FIG. 6 illustrates a graph used to distinguish data using AND nodes from OR nodes as used in accordance with the invention.

The underlying data structure for building and maintaining the profile index is a DAG—such as shown in FIG. 6—widely used in managing data and known to those schooled in the art. Every leaf node of the DAG shown in FIG. 6—a leaf node being a node without out-going links—corresponds to a predicate pn. Hereafter, the term basic predicate and leaf node will be used interchangeably unless otherwise specified in discussing the rest of the invention. Because every internal node corresponds to a Boolean operator of AND, OR or NOT, the data structure is a AND-OR-GRAPH (AOG). The AOG has a special root node that does not have any incoming links. Each direct child of the root node represents one or more user profiles. Within each profile resides the user specified predicates.

After a profile index has been built and maintained in step 504, the basic predicates of the index are evaluated in step 506. Evaluation of the basic predicates involves the matching of the user-specified predicate with the information designated by the predicate. However, in performing the evaluation method of step 506, the matching must take place within a finite amount of time. Additionally, the computation cost of any instance of applying a basic predicate to an information item can always be obtained. The computation cost is represented in the form of a value that reflects the amount of computational resources spent by the evaluation process, which may include processor, memory, I/O, disk space and other associated costs of evaluating a basic predicate.

Evaluation of a profile index in step 508 is a method of evaluating a profile index to obtain a truth-value for every predicate of the profile index and to propagate the value upward through the internal nodes of the DAG representing the profile index all the way to the root node. Some of the leaf nodes encountered during the propagation to the root node may not be evaluated because the evaluation of an associated node may make a given leaf node inconsequential to the profile-matching outcome.

A cost credit adjustment may be made in one embodiment in step 510. This dynamic cost/credit adjustment exploits the Boolean structure found within a user profile. Conceptually, the logical process of matching a user profile against an information item is to apply the Boolean expression of the profile to the information content of the item and decide whether the outcome is True or False. For example, suppose a user profile is a Boolean expression Media-Type(text) and Channel(Almaden-Events). If first predicate is evaluated to FALSE, the entire profile can be evaluated to FALSE without checking the second predicate. In other words, the evaluation of the first predicate will cause the second predicate to become a value that does not affect the outcome of the profile matching.

Profiles are matched with each other and with the information fitting the profile in step 512. Whenever new information is received, a bottom-up evaluation is made through the profile index. Bottom-up refers to beginning at the bottom of the DAG and proceeding to the root node of the DAG. Every leaf of the profile index is evaluated to obtain its current Truth-value. Again, the Truth-value is propagated upward to the root node. The Truth-value of each node representing user profiles is then known and matched to a given information item.

The profile-to-information matching that occurs in step 512 may include profile customization. A user 102 may "personalize" his profile so that only specific information is matched. For example, the user 102 may customize his profile to receive from a sports web site only information about his favorite team, as opposed to receiving information for all teams for a given day. Further, the present invention will in one embodiment match the personalized profile with the corresponding information using a parallel profile matching method as discussed below. The information, once matched to a profile, is pushed to the user in step 514. After the information is pushed, the method ends in task 516.

A fuller understanding of the profile matching method 500—an example of one Boolean based profile matching method—may be found in U.S. patent application Ser. No. 08/978,737, by M. Eichstaedt et al., entitled "METHOD AND APPARATUS FOR EFFICIENT PROFILE MATCHING IN A LARGE SCALE WEBCASTING SYSTEM," which was filed Nov. 26, 1997, assigned to the assignee of the current invention and incorporated by reference herein.

Although a general discussion of one embodiment of the present invention has been made above in regard to FIG. 5, a more detailed discussion of each step follows.

A. Query Language for Profile Specification

A user profile is a persistent query that specifies the kind of information that is of interest to the user and the query language used dictates the way users specify their profile. This invention assumes a Boolean-based query language where each profile is a set of basic predicates connected by Boolean operators. The invention requires the basic predicates to yield a Truth-value of either True or False when they are applied to an information item. For example, a basic predicate can be in the form of "Media-type(text)" or "Channel(Almaden-Events)", where the first predicate requires an information item to be represented in text whereas the second predicate requires it to be from Channel (Almaden-Events).

The fact that no special property on the basic predicates in the query language is required gives this invention wide applicability. For example, it can be effectively applied to systems where only basic text predicates are used, and to systems employing a rich set of basic predicates that allows the users to select fine-grain features of an information item such as color and shape in images.

Furthermore, the method is very adaptable and extensible. For example, the method can effectively be used to match a profile against a set of indexed information items to take advantage of an existing data index. This obviously speeds up the matching process because each data item does not need to be evaluated; only the item identifier contained in the existing data index. The method can also implement multi-predicate evaluation techniques to enhance performance.

1. Build/Maintain Profile Index

The initial state of the profile index referenced in step 504 of FIG. 5 is best visualized as a graph with only one node—the ROOT. However, building and maintaining a profile index after it has been initialized includes creating a profile, and may include adding a new profile, removing a profile, updating an existing profile, or sharing internal nodes of the profile.

a. Creating a Profile

To create a profile (P) in a profile index, a new child C of the ROOT must be created for P. New child C is then assigned a profile ID based on the user ID and his or her channel selection, assuming that a profile with this particular ID does not currently exist in the profile index. If an identical ID already exists, it must be removed before inserting the new profile. Based on the Boolean composition of P, the profile index is expanded as follows.

If P is in the form of P1 AND P2 AND . . . AND Pn, P is marked as an AND node. For each sub-expression Pi (i=1, . . . , n), a check is performed to see if Pi is a basic predicate or not. If Pi is already a basic predicate, then a check is made to find out if the same predicate is already in the profile index. If so, a new link is inserted so that P will point to that node as one of its children. If not, a new leaf node for Pi is entered into the profile index as the child of P. If Pi is not a basic predicate, the same graph expansion process is used recursively.

If P is in the form of P1 OR P2 OR . . . Pn, P is marked as an OR node. The remaining steps of handling P1, . . . , Pn is the same as if P is an AND node as discussed above.

If P is in the form of NOT P1, P is marked as a NOT node and the remaining steps of handling P1, . . . , Pn is the same as if P is an AND node as discussed above. However, the node of P for the unary operator NOT may not be expanded. In this case, a tag is placed on the node P to indicate that its Truth-value should be reverted. If profile P has only one single node, special consideration is needed because a profile node cannot hold a basic predicate. In this case, a new child C of ROOT is created as described above, where C is an AND or an OR node. A new leaf node is initialized which holds the basic predicate of P. This leaf node becomes the only child of the new profile node. If the profile index already has a leaf node with the requested predicate, the same steps of handling P1 . . . Pn discussed above is used and the existing leaf node is shared.

In the preferred embodiment, a reference of all leaf nodes that have been inserted or shared during the steps above are kept in a separate data structure. This data structure allows efficient access to all relevant leaf nodes for a new profile. The optimization and normalization steps which may also be used in one embodiment are discussed below with respect to sharing nodes.

b. Removing an Existing Profile

If an existing profile needs to be removed, removal is performed similarly to traversing and removing links. For each node visited during the traversal, the link between that node and its parent node is removed. If any node encountered in the process has zero incoming-links, that node is also removed.

If a new profile is received, the invention handles processing of a new profile depending upon whether or not the user requesting the profile currently exists in the profile database. If the user requesting a new profile does not exist in the database, then a determination is made as to whether open or closed registration mode is being used. If open registration mode is not being used, the profile is rejected. If open registration is being used, then a new user record is created in the profile database. Open registration and closed registration are discussed above.

If the user requesting the new profile does exist in the profile database, then a password may be required in order for the new profile to be received into the profile database. If an incorrect password is supplied, the profile is rejected. However, if the supplied password is correct, the user record in the profile database is updated according to the supplied information. Updating a user record may comprise changing information contained in a current record or creating a new user profile as requested. If the user requested additional profiles, then the method repeats.

It is expected that users will update their profiles to adjust for their changing needs for information feeding. A simple way to update an existing profile in the profile index is to remove that profile and then add a new profile as discussed above. For optimization, internal nodes may be shared.

c. Sharing Internal Nodes

An optimization to significantly reduce the size of the profile is to share internal nodes in the profile index. It is quite possible that many users will share the same interests on certain topics and therefore end up using the same Boolean expression at different levels of their profiles. It may also be true that multiple users will have identical profiles. To exploit this kind of profile redundancy, internal nodes may be shared in the profile index in the preferred embodiment. For an in depth discussion of methods used for sharing internal nodes, reference is made to U.S. patent application Ser. No. 08/978,737, mentioned above.

2. Evaluating Basic Predicates

Step 506 of FIG. 5 addresses evaluating basic predicates. The present invention employs at least two methods for dealing with these evaluations.

a. Evaluating a Single Basic Predicate

Generally, the present invention does not require any special method for evaluating a basic predicate and may be evaluated on an individual basis using the group evaluation method discussed below. However, two basic requirements to evaluating basic predicates must be followed. First, the Truth-value of a basic predicate when applied to any information item must always been obtained within a finite amount of time. In other words, if the Truth-value cannot be contained within a designated period of time, the predicate is not evaluated. Second, the computation cost of any instance of applying a basic predicate to a specific information item can always be obtained. Computation cost is represented in the form of a numerical value reflecting the amount of computation resources spent on the evaluation process. This computation time may include costs for the processor, memory, I/O, disk space, etc.

b. Group Evaluation of Basic Predicates

Basic predicates do not have to be evaluated one at a time. Depending on the nature of the predicates, evaluating a group of predicates at once may yield superior performance. The basic profile-matching process of this invention is very flexible and can easily accommodate the grouping of a set of basic predicates into a single unit to be evaluated together against an information item. The criteria for selecting a predicate group may depend very much on the nature of the predicates and their integration with the overall dynamic cost/credit-based evaluation process. Such kind of integration can be done by assigning different predicates into one or more evaluation groups as discussed below before evaluating a specific information item. These evaluation groups may be mapped to separate processors operating in parallel to process the data.

As an example, consider text predicates that require a text document to satisfy certain properties. The evaluation of a text predicate is equivalent of finding a specific text pattern in the document. In other words, a text predicate can be viewed as asserting a text pattern. As discussed in S. Wu et al., "A Fast Method for Multi-Pattern Searching", *Technical Report TR*94-17, Department of Computer Science, University of Arizona, May 1994; R. S. Boyer et al., "A Fast String Searching Method", *Communications of the ACM* 20, pp. 762–772, October 1977; and S. Wu et al., "Agrep—A Fast Approximate Pattern-Matching Tool", *Usenix Winter* 1992 *Technical Conference*, San Francisco, pp. 153–162, January 1992, finding multiple text patterns in a document is often more efficient than finding one pattern at a time.

3. Using Multiple Processors

Figure 7:
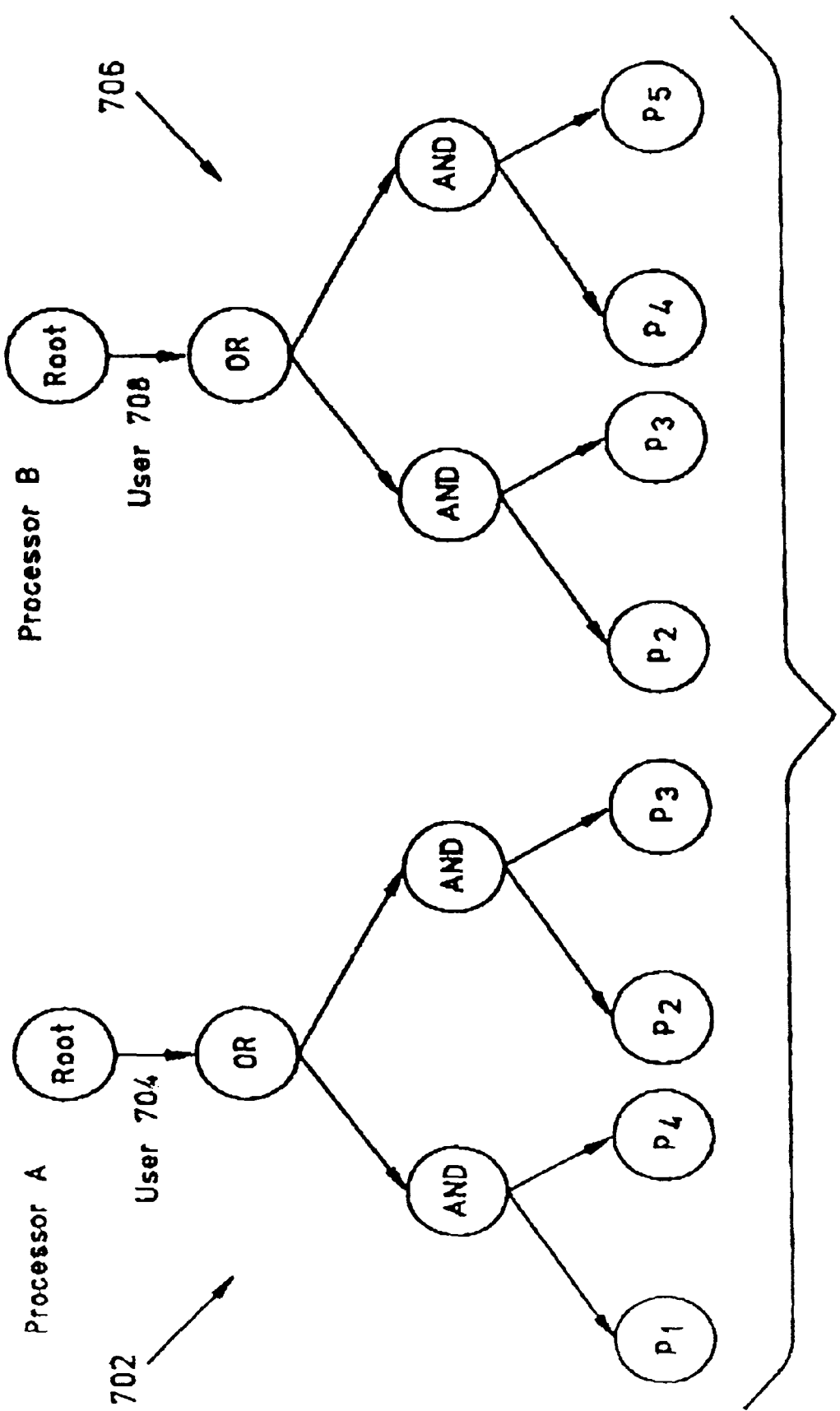
FIG. 7 shows a graph used to explain a parallel processing method used to match predicates with desired information in accordance with the present invention.

FIG. 7 shows a DAG 702 constructed for the profile of a user 704. The DAG 702 is evaluated by a processor A that is used in evaluating predicates $P_1$–$P_4$. The predicates correspond to specific information that the user 704 wants to be pushed to a designated address or addresses. The address may be an Internet address, a logical address, a telephonic address or any other address that defines a logical or physical location to which the specific information is pushed. Also shown in FIG. 7 is a processor B that is used in evaluating predicates $P_2$–$P_5$ selected for a profile by a user 708. As discussed above, a DAG 706 is logically constructed to profile the desires of the user 708 and is processed by processor B.

In one embodiment, the processor A only processes data relating to a set designated profiles. When the processing of the data is completed, a next data set relating to this set of profiles is processed. The processor B executes commands in a similar manner. There is no communication needed between A and B. In another embodiment, processor A or B may evaluate the data item against the set of predicates common to their profiles. Then, in parallel, they process the predicates that only belong to themselves exclusively.

To further expedite the processing, the present invention, in one embodiment, may partition a designated profile and use multiple processors to process the profile data. These processors are preferably dedicated to processing the designated profile to completion before accepting new work. However, in another embodiment, the multiple processors may be shared with other resources while processing a designated profile partition.

4. Parallel Profile Matching

Figure 8:
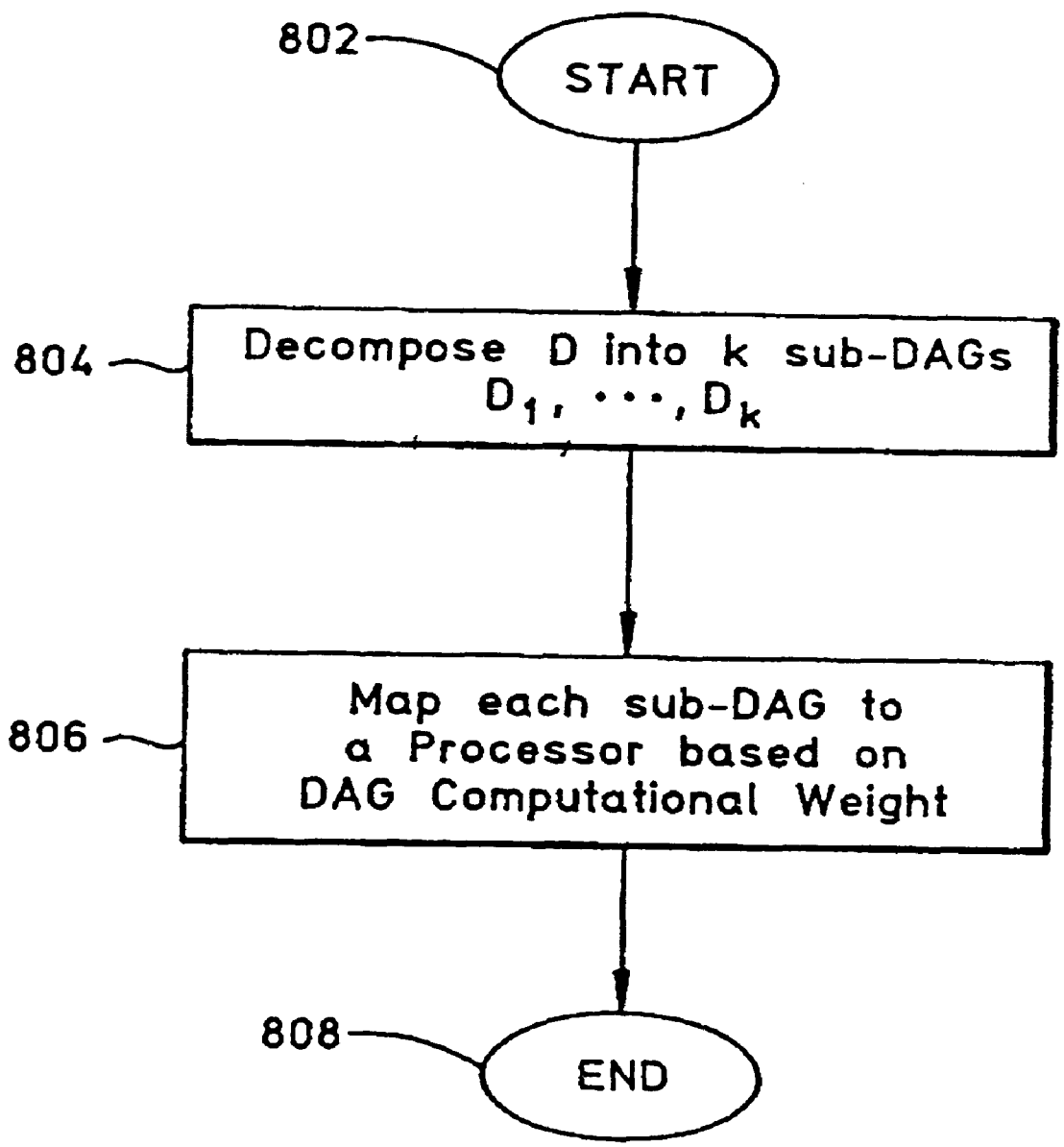
FIG. 8 is a flowchart of an operational sequence for parallel profile matching method in accordance with the invention.

The profile-to-information matching of step 512 occurs in parallel in one embodiment of the present invention as diagramed in FIG. 8.

Let $A=\{A_1, \ldots, A_n\}$, be a set of profile expressions over a predicate set $P=\{P_1, \ldots P_m\}$. Let G be the reduced DAG for all expressions in A. If the profile system 300 shown in FIGS. 3 and 4 have k processors, the present invention decomposes G into k DAGs $G_1, \ldots, G_k$ in step 804 and maps each sub-DAG to a processor in step 806.

The main cost evaluating a DAG is the evaluation of basic predicates. In order to efficiently handle the partitioning problem, the evaluation work is balanced across multiple processors as shown in FIG. 7. Dependency or redundancy among the processors is minimized to simplify parallel profile matching and to reduce the overhead.

a. Set Decomposition

Figure 9:
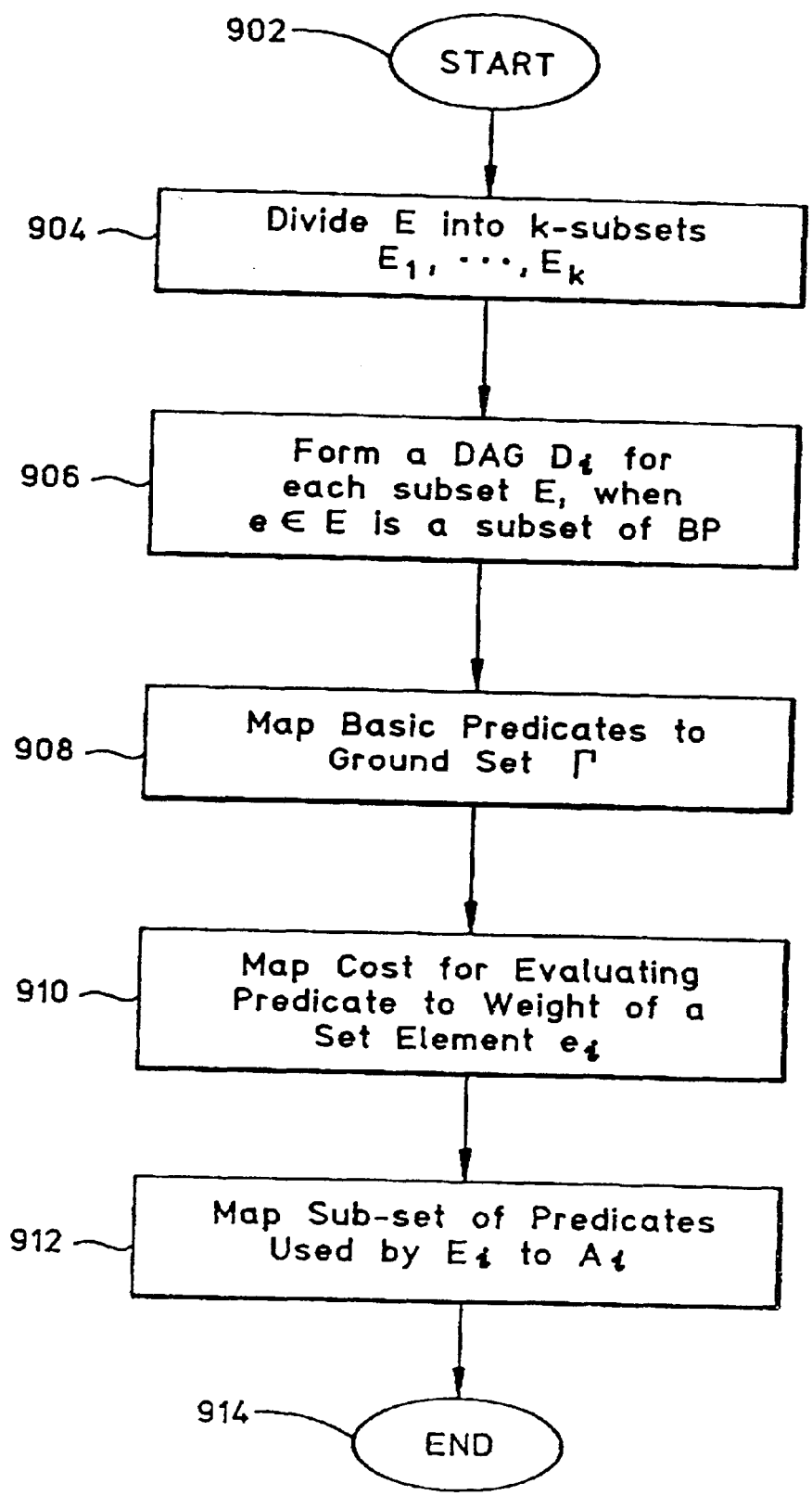
FIGS. 9 is a flow chart of an operational sequence used for the set decomposition of FIG. 8 in accordance with one embodiment of the invention.

In one embodiment, the present invention decomposes G as shown in step 804 of FIG. 8 using a combinatorial optimization SET DECOMPOSITION as shown in FIG. 9. In general, this method is summarized as:

Given a ground set $\Gamma=\{g_1, \ldots, g_m\}$ with weights $\{w_1, \ldots, w_m\}$, and a collection of subsets $A_1, \ldots, A_n$ of $\Gamma$, and an integer k, construct k subsets of $\Gamma$, $G_1, \ldots, G_k$ such that for each i in the range $1 \leq i \leq n$, there exists a j such that $A_i \subseteq G_j$. In the preferred embodiment, max $$\max_{j=1}^{k}\left(\sum_{s \in G_j} w(s)\right)$$

is minimized.

Given a collection of Boolean expressions $E=\{E_1, \ldots, E_n\}$ over basic predicates $BP=\{P_1, \ldots, P_m\}$, E is first divided into k subsets $e_1, \ldots, e_k$ in step 904. Thereafter, a DAG $G_i$ is formed for each subset $E_i$ in step 906. Each expression $e \in E$ is defined as a subset of BP. This results in a natural mapping of the partitioned profiles to SET DECOMPOSITION. The basic predicates are mapped to the ground set $\Gamma$ in step 908, the cost for evaluating a predicate is mapped to the weight of a set element in step 910, and the subset of predicates used by each expression $e_i$ is mapped to $A_i$ in step 912. The method ends in step 914.

In the following subsection, efficient heuristics for SET DECOMPOSITION as used in various embodiments of the present invention to partition a profile are discussed.

b. Greedy Clustering

In one embodiment, SET DECOMPOSITION may comprise a greedy scheme for the mapping of steps 908–912 of FIG. 9, motivated by list scheduling. A full discussion of list scheduling may be found in R. L. Graham, "Bound for Certain Multiprocessor Anomalies," *Bell System Technical Journal*, 1996, pp. 1563–1581, incorporated herein by reference. For any subset $B \subseteq \Gamma$, let w $$w(B) = \sum_{g_j \in B} w_j$$

be the total weight of elements in B. For any two subsets B, $C \in \Gamma$, let overlap $(B,C)=w(B \cap C)$. Therefore $w(B \cup C)=w(B)+w(C)-\text{overlap}(B, C)$.

Let $\pi$ be a permutation of $\{1, 2, \ldots n\}$. For example, $\pi$ is the permutation generated by sorting $w(A_1), \ldots, w(A_n)$ in a descending ordering, or $\pi$ is the identity permutation. The set A is permeated with $\pi$ and now assume A is given in order of the permutation. The greedy scheme can be presented as follows:

Greedy-Mapping
1. Let $G_1, \ldots, G_k$ be k empty sets.
2. For i=1 to n,
   (a) For each j=1, 2, . . . , k, let fitness(j)=w($A_i \cup G_j$)= w($A_i$)+w($G_j$)−overlap($A_p$, $G_j$).
   (b) Let j be the index with the smallest fitness.
   (c) $G_j = G_j \cup A_r$
3. Return $G_l, \ldots, G_k$.

This greedy scheme is used where sets do not have unacceptable overlap, denoted by ply, as $$ply(A) = \left(\sum_{j=1}^{n} w(A_i)\right) \bigg/ w\left(\bigcup_{j=1}^{n} A_j\right)$$

The simplicity and efficiency of the Greedy Method makes it very attractive for practical implementations. If a hash function is used to compute the overlap between two sets, the method implements the method in $$O\left(k \sum_{i=1}^{n} |A_i|\right)$$

time. Notice that the number of user profiles is typically of a large scale (e.g., 1,000,000 or more), and the method takes no more than $$O\left(k \sum_{i=1}^{n} |A_i|\right)$$

time.

c. β-Mapping

The Greedy Method, may not produce a solution close to the optimal solution in the worst case. One such "bad" example follows.

Suppose $n=k^2$ sets $A_{1,1}, A_{2,2} \ldots , A_{k,k}$, where $A_{ij} = \{a_{i,1}, a_{i,2}, \ldots , a_{i,k}, b_j\}$. Notice that $A_{ij1}$ and $A_{ij2}$ differ by only one entry, $b_{j1}$ versus $b_{j2}$. The optimal decomposition is to merge all $A_{i,*}$ to give $G_i$ of size 2k. The greedy-method, however, first assigns $A_{1j}$ to $S_j$, for all $1 \leq j \leq k$. Then it iteratively assigns $A_{ij}$ for all $2 \leq i \leq k$ and $1 \leq j \leq k$. The cost of its decomposition is more than $k^2+1$ and its ratio to the optimal solution is k/2.

More specifically, the greedy-method assigns $A_{2,2}$ to $G_2$ instead of $G_1$, because the merge of $A_{2,2}$ with $G_2$ (which is $A_{1,2}$) has size 2k+1 and overlap 1, while the union of $A_{2,2}$ with $G_1$ has size 2k+2 but overlap k. This results in the size 2k+1 being given more weight than the overlap. In another embodiment, this method gives the overlap more credit resulting in a better relationship between the overlap and the size.

In this β-Mapping embodiment, $\beta \geq 1$ is a constant.
1. Let $G_1, \ldots, G_k$ be k empty set.
2. For i=1 to n.
   (a) for each j=1,2, . . . , k, let fitness(j)=w($A_i \cup G_j$)=w($A_i$)+w($G_j$)−β· overlap($A_i$, $G_j$).
   (b) Let j be the index with the smallest fitness.
   (c) $G_j = G_j \cup A_i$.
3. Return $G_1, \ldots, G_k$.

When β=1, the β-Mapping embodiment is the greedy-mapping embodiment. If β=1.1, and the β-Mapping methods are applied to the example above, a decomposition of size 3k occurs because it assigns $A_{ij}$, for all $1 \leq j \leq k$ together with $A_{1,i}$ to $G_i$. $A_{1,i}$ is assigned to $G_i$ because it was assigned as the first k sets. However, if the first k sets in the permutation are $A_{1,1}, A_{2,1}, \ldots , A_{p,1}$ then the 1.1-mapping finds the optimal decomposition.

As shown above, the β-Mapping embodiment of the present invention enjoys the same simplicity and efficiency as the Greedy-Mapping method. But by properly choosing β, better performance can be obtained using β-Mapping instead of greedy-mapping.

However, the size of β is not unlimited. There are a two constants $\alpha_1$ and $\alpha_2$ such that the performance of β-Mapping method depends on β according to $\alpha_1\beta + \alpha_2/\beta$. If β is too large, say ∞, then β-Mapping tends to assign all sets into one component. Conversely, the β-Mapping method may not give enough credit to overlaps. Therefore, cost function is modeled as $\alpha_1\beta + \alpha_2/\beta$ to determine the parameters $\alpha_1$ and $\alpha_2$ after two choices of β, then applying β-Mapping with $$\beta = \sqrt{\alpha_1/\alpha_2}.$$

This allows the method to optimize β according to the structure of the profiles.

d. Clustering

The example and discussion of the previous subsection shows that the performance of both the greedy-mapping method and the β-Mapping method are sensitive to the assignment of the first k sets, hereafter called the "seeds" of the components.

Another embodiment of the present invention implements multi-way graph partitioning via clustering. To partition a graph into k subgraphs, clustering starts with k nodes as seeds and tries to grow all seeds simultaneously (e.g., in breadth-first fashion) to obtain k-equally sized subgraphs. At each step, each seed tries to include its neighboring nodes into its components. Any conflict is resolved by making most of the edges local to each component. To obtain better partition, the k seeds should be pairwisely "far" away from each other.

In this embodiment, overlap ratio $\phi(A_i, A_j)$ between $A_i$ and $A_j$ is defined as overlap $$(A_i, A_j) / \sqrt{w(A_i)w(A_j)}.$$

Two subsets are "close" if their overlap ratio is large.

Accordingly, k mutually faraway seeds are chosen as follows: Let $S_1$ be the set with the largest weight. For i=2 to k, let $S_i$ be the set with the largest weight among those whose largest overlap ratio with $G_1, \ldots , G_{i-1}$ is the smallest. Several related heuristics for finding mutually far away seeds are discussed in S. H. Teng, "Greedy Algorithms for Low Energy and Mutually Distant Sampling," *J. Algorithms*, 1999, and incorporated herein by reference. After selecting the first k seeds, the β-Mapping method is applied to the rest of the sets.

e. Incremental Clustering

In another embodiment, the method for finding k mutually far away seeds can be extended to the design of an incremental clustering method for SET DECOMPOSITION. This incremental clustering method uses the two natural lower bounds on SET DECOMPOSITION, $W_{max} = \max_i w(A_i)$ and $$W_{avg} = \left(\sum_{i=1}^{n} w(A_i)\right) \bigg/ k.$$

Let W=max ($W_{max}, W_{avg}$). Choose a constant $1 \leq \alpha \leq 2$. In this implementation, α is chosen to be about 1.1. The method is as follows:

1. Let $G_1, \ldots, G_k$ to kempty sets and $A=\{A_1, \ldots, A_n\}$.
2. For i=1 to k,
    (a) If i=1 then let j be the index of the set in A with the largest cost; otherwise, let j be the index of the set in A with the largest cost among those whose largest overlap ratio with $G_1, \ldots, G_{i-1}$ is the smallest. Let $G_i=A_j$. Remove $A_j$ from A.
    (b) While $(w(G_i)<\alpha W)$ and A is not empty:
       Let j be the index of the set in A whose overlap ratio with $G_i$ is the largest. If $w(G_i \cup A_j) \leq \alpha W$, then let $G_i=G_i \cup A_j$. Remove $A_j$ from A; otherwise exit the while loop.
3. If A is not empty, apply β-Mapping to the rest of the sets in A.
4. Return $G_1, \ldots, G_k$.

The Incremental Clustering method grows one cluster at a time until a certain size is reached. The method then chooses a seed that is farthest away from the current clusters to grow a new cluster, and then applies the β-Mapping method to map the rest of the sets.

As discussed below, each method of the invention finds a set of sub-DAGs so that each information item can be evaluated using the sub-DAGs. If the evaluation of the sub-DAGs is performed on separate processors, further reductions in overall evaluation time may be realized.

Signal-Bearing Media

In the context of FIGS. 1 through 3, such a method may be implemented, for example, by operating the profile system 300, as embodied by a digital data processing apparatus contained within the webcasting system 100, to execute a sequence of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to perform a method to match user specified profiles with desired information.

Figure 10:
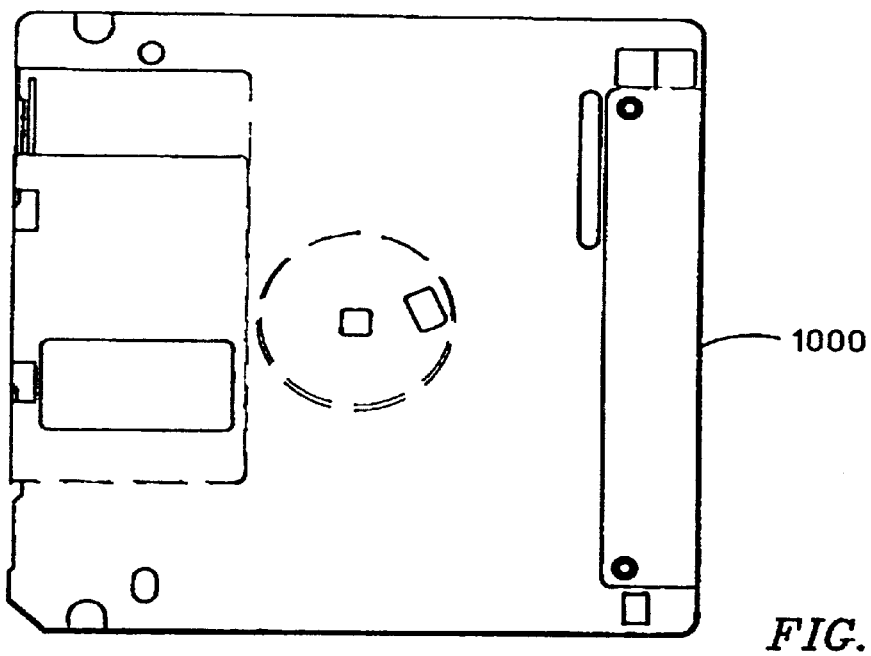
FIG. 10 shows an exemplary signal-bearing medium in accordance with the invention.

This signal-bearing media may comprise, for example, RAM (not shown) contained within the webcasting system 100. Alternatively, the instructions may be contained in another signal-bearing media, such as a magnetic data storage diskette 1000 shown in FIG. 10 and contained within a server 104 or a host 108, and directly or indirectly accessible by the profile system 300. Whether contained in the system 100 or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape), paper "punch" cards, or other suitable signal-bearing media including transmission media such as digital and analog, and communication links and wireless. In an illustrative embodiment of the invention, the machine-readable instructions may comprise software object code, compiled from a language such as C, C-compatible, or other programming language commonly used for programming with respect to the present invention's environment.

OTHER EMBODIMENTS

While there have been shown what are presently considered to be preferred embodiments of the invention, it will be apparent to those skilled in the art that various changes and modifications can be made herein without departing from the scope of the invention as defined by the appended claims.

What is claimed is:

1. A method for parallel matching a user profile with desired data, the method comprising:
    partitioning a profile database into sub-partitions having data subsets, the subsets comprising predicates, the predicates used to assert selected properties to information items;
    mapping each sub-partition onto one or more processors yielding greatest processing efficiency;
    communicating an information item to each processor; and
    matching the information item with a corresponding predicate.

2. The method recited in claim 1, wherein the profile database is partitioned based upon a cost of each sub-partition, the cost related to system overhead required to process the sub-partition.

3. The method recited in claim 2, wherein a sub-partition is mapped to one processor.

4. The method recited in claim 3, wherein a processor to which a sub-partition is mapped is based upon a sub-partition's cost.

5. The method recited in claim 4, wherein a highest cost sub-partition is mapped to a processor with a fastest processing capability compared to other processors available in the system for processing sub-partitions, and all next-highest cost sub-partitions are mapped correspondingly to all next-fastest available processors.

6. The method recited in claim 5, mapping further comprising:
    if the sub-partition's data subsets have a predetermined overlap, then using a means for greedy mapping partitioning the profile database; and
    if the data subsets have unacceptable overlap, using another partitioning means for partitioning the profile database.

7. The method recited in claim 6, using another partitioning means comprising using a means for β-Mapping partitioning the profile database.

8. The method recited in claim 6, using another partitioning means comprising using a means for clustering partitioning the database.

9. The method recited in claim 6, using another partitioning means comprising using a means for incremental clustering partitioning of the database.

10. The method recited in claim 6, further comprising:
    building a profile index, wherein the profile index includes a collection of user profiles including predicates; and
    identifying predicates shared by user profiles.

11. The method recited in claim 10, wherein evaluating the predicates further comprises:
    dynamically monitoring the evaluation of each predicate;
    assigning an evaluation cost to each predicate based upon the monitoring, wherein the cost of a cheap predicate requires less evaluation time and the cost of an expensive predicate requires more evaluation time; and
    adjusting the mapping of the predicates to a processor based upon dynamically determined processing cost.

12. The method recited in claim 11, wherein evaluating a predicate against a data item by:
    accessing an index for the data items, the data items having contents and the index comprising a list of the contents; and
    evaluating a predicate against the list of the contents.

13. A signal-bearing medium tangibly embodying a program of machine-readable instructions executable by a digital processing apparatus to perform a method for matching a user profile with desired data, said method comprising:

partitioning a profile database into sub-partitions having data subsets, the subsets comprising predicates, the predicates used to assert selected properties to information items;

mapping each sub-partition onto one or more processors yielding greatest processing efficiency;

communicating an information item to each processor; and matching the information item with a corresponding predicate.

14. The signal-bearing medium recited in claim 13, wherein the method includes partitioning the profile database based upon a cost of each sub-partition, the cost related to system overhead required to process the sub-partition.

15. The signal-bearing medium embodying a program for the method recited in claim 14, wherein a sub-partition is mapped to a one processor.

16. The signal-bearing medium recited in claim 15, the method further comprising wherein a processor to which a sub-partition is mapped is upon a sub-partition's cost.

17. The signal-bearing medium recited in claim 16, the method step further comprising wherein a highest cost sub-partition is mapped to a processor with a fastest processing capability compared to other processors available in the system for processing sub-partitions, and all next-highest cost sub-partitions are mapped correspondingly to a next-fastest available processor.

18. The signal-bearing medium recited in claim 17, the method step further comprising:

if the sub-partitions data subsets have acceptable overlap, then using a greedy clustering means for partitioning the profile database; and if the data subsets have unacceptable overlap, using another partitioning means for partitioning the profile database.

19. The signal-bearing medium recited in claim 18, the method further comprising:

building a profile index, wherein the profile index includes a collection of user profiles including predicates; and identifying predicates shared by user profiles.

20. The signal-bearing medium recited in claim 19, the method further comprising:

dynamically monitoring the evaluation of each predicate;

assigning an evaluation cost to each predicate based upon the monitoring, wherein the cost of a cheap predicate requires less evaluation time and the cost of an expensive predicate requires more evaluation time; and adjusting the mapping of the predicates to a processor based upon dynamically determined processing cost.

21. The signal-bearing medium recited in claim 20, the method further comprising:

accessing an index for the data items, the data items having contents and the index comprising a list of the contents; and evaluating a predicate against the list of the contents.

22. An apparatus to match a user profile with desired data, the apparatus comprising:

a webcasting system, the system including:
      a profile handler;
      a profile matcher;
      a profile database;
      an data item fetcher;
         a processor, wherein the processor is capable of executing instructions to:
            partitioning a profile database into sub-partitions having data subsets, the subsets comprising predicates, the predicates used to assert selected properties to information items;
            mapping each sub-partition onto one or more processors yielding greatest processing efficiency;
            communicating an information item to each processor; and
            matching the information item with a corresponding predicate.

23. The apparatus recited in claim 22, wherein the processor is further capable of executing instructions to partition the profile database based upon a cost of each sub-partition, the cost related to system overhead required to process the sub-partition.

24. The apparatus recited in claim 23, wherein the processor is further capable of executing instructions to map a sub-partition to one processor.

25. The apparatus recited in claim 24, wherein the processor is further capable of executing instructions to map a sub-partition to a processor based upon the sub-partition's cost.

26. The apparatus recited in claim 25, wherein a highest cost sub-partition is mapped to a processor with a fastest processing capability compared to other processors available in the system for processing sub-partitions, and all next-highest cost sub-partitions are mapped correspondingly to a next-fastest available processor.

27. The apparatus recited in claim 26, wherein the processor is further capable of executing instructions to:

if the sub-partitions data subsets have acceptable overlap, then using a greedy clustering means for partitioning the profile database; and if the data subsets have unacceptable overlap, using another partitioning means for partitioning the profile database.

28. The apparatus recited in claim 27, wherein the processor is further capable of executing instructions for:

if the sub-partitions data subsets have acceptable overlap, then using a greedy clustering means for partitioning the profile database, and if the data subsets have unacceptable overlap, using another partitioning means for partitioning the profile database.

29. The apparatus recited in claim 28, wherein the processor is further capable of executing instructions for:

building a profile index, wherein the profile index includes a collection of user profiles including predicates; and identifying predicates shared by user profiles.

30. The apparatus recited in claim 29, wherein the processor is further capable of executing instructions for:

dynamically monitoring the evaluation of each predicate;

assigning an evaluation cost to each predicate based upon the monitoring, wherein the cost of a cheap predicate requires less evaluation time and the cost of an expensive predicate requires more evaluation time; and adjusting the mapping of the predicates to a processor based upon dynamically determined processing cost.

31. The apparatus recited in claim 30, wherein the processor is further capable of executing instructions for:

accessing an index for the data items, the data items having contents and the index comprising a list of the contents; and evaluating a predicate against the list of the contents.

32. A method for matching a user profile with selected data, the method comprising:

partitioning a profile database into sub-partitions having data subsets, the subsets comprising predicates, the predicates used to assert selected properties to information items;

mapping each sub-partition onto one or more processors yielding greatest processing efficiency;

communicating an information item to each processor; and matching the information item with a corresponding predicate;

wherein the profile database is partitioned based upon a cost of each sub-partition, the cost related to system overhead required to process the sub-partition;

wherein a sub-partition is mapped to a one processor; and wherein a processor to which a sub-partition is mapped is upon a sub-partition's cost.

* * * * *

UNITED STATES PATENT AND TRADEMARK OFFICE
CERTIFICATE OF CORRECTION

PATENT NO. : 6,169,989 B1
DATED : January 2, 2001
INVENTOR(S) : Eichstaedt et al.

It is certified that error appears in the above-identified patent and that said Letters Patent is hereby corrected as shown below:

<u>Column 13,</u>
Line 39, change "$A_{2,2}$" to -- $A_{1,2}$ --;

<u>Column 15,</u>
Line 1, add a space between -- "$k$ empty" --.

Signed and Sealed this

Tenth Day of August, 2004

JON W. DUDAS
*Acting Director of the United States Patent and Trademark Office*